US012221809B2

(12) United States Patent
Lim et al.

(10) Patent No.: US 12,221,809 B2
(45) Date of Patent: Feb. 11, 2025

(54) AUTO-OPEN DOOR LOCK APPARATUS FOR HOME APPLIANCE

(71) Applicant: DUAL POWER ELECTRONICS CO., LTD, Jeongeup-si (KR)

(72) Inventors: Jang-Joo Lim, Seoul (KR); Sang-Won Suh, Jeongeup-si (KR); Jung-Gil Lee, Jeongeup-si (KR); Hee-Chang Kim, Jeongeup-si (KR)

(73) Assignee: DUAL POWER ELECTRONICS CO., LTD, Jeongeup-si (KR)

( * ) Notice: Subject to any disclaimer, the term of this patent is extended or adjusted under 35 U.S.C. 154(b) by 204 days.

(21) Appl. No.: 17/938,484

(22) Filed: Oct. 6, 2022

(65) Prior Publication Data

US 2023/0057425 A1 Feb. 23, 2023

Related U.S. Application Data

(63) Continuation of application No. PCT/KR2021/003579, filed on Mar. 23, 2021.

(30) Foreign Application Priority Data

Aug. 4, 2020 (KR) ........................ 10-2020-0097511

(51) Int. Cl.
*E05B 47/00* (2006.01)
*E05B 65/00* (2006.01)

(52) U.S. Cl.
CPC .......... *E05B 47/0012* (2013.01); *E05B 65/00* (2013.01); *E05B 2047/002* (2013.01); *E05Y 2900/30* (2013.01)

(58) Field of Classification Search
CPC ........... E05B 47/0012; E05B 2047/002; E05B 17/0041; E05B 77/42; Y10T 292/1082;
(Continued)

(56) References Cited

U.S. PATENT DOCUMENTS 985,995 A * 3/1911 Graham .................... E06B 9/54 292/201
1,320,444 A * 11/1919 Buczynski .......... E05B 65/0811 70/79
(Continued)

FOREIGN PATENT DOCUMENTS

CN 105756432 A * 7/2016
CN 108979336 A * 12/2018 ............. E05B 15/00
(Continued)

OTHER PUBLICATIONS

International Search Report issued in PCT/KR2021/003579; mailed Sep. 1, 2021.
(Continued)

*Primary Examiner* — Carlos Lugo
(74) *Attorney, Agent, or Firm* — Studebaker & Brackett PC

(57) ABSTRACT

An auto-open door lock apparatus including a main body cover having a space therein, and a motor installed inside the main body cover to provide a driving force. The auto-open door lock apparatus further includes at least: a locker which is coupled to or separates from a hook that is introduced from the outside through rotation; a locker shaft having one end connected to the locker, and formed in the center of rotation of the locker; a clutch gear connected to the other end of the locker shaft to induce rotation of the locker; a locker spring connected to one side of the locker to provide a rotational restoring force to the locker; a rack slide which provides a rotational force of the motor to the locker through the clutch gear; and a pinion gear which transmits the rotational force of the motor to the rack slide.

5 Claims, 6 Drawing Sheets

(58) Field of Classification Search
CPC ......... Y10T 292/0911; Y10T 292/0916; Y10T 292/1079; Y10T 292/308; Y10T 292/1089; Y10S 292/69
USPC .................................................. 292/279, 280
See application file for complete search history.

(56) References Cited

U.S. PATENT DOCUMENTS

| | | | | | |
|---|---|---|---|---|---|
| 1,646,181 | A * | 10/1927 | Babekuhl | E05B 83/02 70/95 |
| 4,875,723 | A * | 10/1989 | Compeau | E05B 81/20 292/201 |
| 5,180,198 | A * | 1/1993 | Nakamura | E05B 81/20 292/201 |
| 5,537,848 | A * | 7/1996 | Grzanka | E05B 77/28 292/201 |
| 6,739,633 | B2 * | 5/2004 | Holloway | E05B 83/34 292/201 |
| 7,823,936 | B2 * | 11/2010 | Compeau | G07F 9/10 292/216 |
| 8,186,010 | B2 * | 5/2012 | Tomiji | E05F 5/027 16/75 |
| 9,624,699 | B2 * | 4/2017 | Rocchitelli | D06F 39/14 |
| 10,119,312 | B2 * | 11/2018 | Wang | E05C 19/12 |
| 2007/0024062 | A1 | 2/2007 | Compeau | |
| 2008/0093496 | A1 | 4/2008 | Klippert | |
| 2012/0292925 | A1 * | 11/2012 | Lundberg | E05B 63/0056 292/144 |
| 2015/0135867 | A1 * | 5/2015 | Cheng | E05B 81/40 74/89.23 |

FOREIGN PATENT DOCUMENTS

| | | | | |
|---|---|---|---|---|
| DE | 19960809 | A1 | 6/2001 | |
| DE | 102016012608 | A1 | 4/2018 | |
| DE | 102017100739 | B3 * | 6/2018 | E05B 47/0012 |
| FR | 2711712 | A1 * | 5/1995 | E05B 15/004 |
| JP | H10-286394 | A | 10/1998 | |
| KR | 10-2004-0010414 | A | 1/2004 | |
| KR | 20110120754 | A * | 11/2011 | |
| KR | 10-2012-0122777 | A | 11/2012 | |
| KR | 10-2015-0001989 | A | 1/2015 | |
| KR | 10-1667916 | B1 | 10/2016 | |
| KR | 10-1915250 | B1 | 11/2018 | |

OTHER PUBLICATIONS

The extended European search report issued by the European Patent Office on May 21, 2024, which corresponds to European Patent Application No. 21852283.7.

* cited by examiner

AUTO-OPEN DOOR LOCK APPARATUS FOR HOME APPLIANCE

CROSS-REFERENCE TO RELATED APPLICATIONS

The present application is a continuation of International Patent Application No. PCT/KR2021/003579, filed on Mar. 23, 2021, which is based upon and claims the benefit of priority to Korean Patent Application No. 10-2020-0097511 filed on Aug. 4, 2020. The disclosures of the above-listed applications are hereby incorporated by reference herein in their entirety.

TECHNICAL FIELD

The present invention relates to a door lock device for home appliances and more particularly, to a door lock device mounted to a washing machine, a dryer, and the like.

RELATED ART

In our daily lives, there are various home appliances. In particular, in the case of a washing machine, a dryer, a dishwasher, and a microwave oven that are used by inputting contents, a door is installed such that the input contents may be blocked from an outside and a locking device that opens and closes the door is an essential component of such home appliance.

Until recently, various technologies related to a door lock device have been developed. Representative inventions include Korean Patent Registration No. 10-1667916 (push and push door lock device), Korean Patent Registration No. 10-1915250 (manual door lock device), and the like.

The push and push door lock device describes a door lock device in which a door automatically opens without a user opening the door when an operation of a corresponding home appliance is terminated.

The push and push door lock device includes an unlocking button installed in a main body and configured to unlock a locker by releasing a restraining force of a fastening member by a sliding operation and a driving unit configured to selectively control a door holding operation, a door locking operation, and an autocratic door opening operation by a rotational motion of a rotational shaft having a cam protrusion at one side. However, since a driving unit and a sensing member sense a locking operation or an unlocking operation of a locker by sensing a position of a cam protrusion, the above device has an issue in that the overall configuration and control are complex.

The manual door lock device describes a door lock device that may manually operate in a simple structure, which differs from the existing method that electronically operates by a solenoid.

However, the above manual door lock device adopts a manual control method that requires an action of a user, which may be slightly against the trend of convenience-oriented home appliances.

Technical Object

An objective of the present invention is to provide an auto-open door lock device at may perform stable locking and unlocking with a simple configuration and few failures.

Technical Solution

An auto-open door lock device according to an example embodiment refers to an auto-open door lock device including a main body cover having an internal space and a motor installed in the main body cover to provide a driving force, and includes a locker configured to couple to or separate from a hook that is introduced from an outside through rotation; a locker shaft having one end connected to the locker and formed at the center of rotation of the locker; a clutch gear configured to connect to another end of the locker shaft and to induce rotation of the locker; a locker spring configured to connect to one side of the locker and to provide a rotational restoring force to the locker; a rack slide configured to provide a rotational force of the motor to the locker through the clutch gear; and a pinion gear configured to transmit the rotational force of the motor to the rack slide. The rack slide includes a first rack gear configured to engage with the clutch gear in a predetermined area at one end; a second rack gear configured to engage with the pinion gear in a predetermined area at another end; and a micro switch formed between the first rack gear and the second rack gear.

Also, the auto-open door lock device may further include a slide spring configured to linearly move the rack slide in the direction of the clutch gear through one end being coupled to the main body cover and another end being connected to the rack slide.

Also, the auto-open door lock device may further include a locker locking slide configured to insert into a locker fastening groove formed in the locker and to prevent rotation of the locker.

Also, the other end of the locker shaft may be formed with a pawl that protrudes from a predetermined area of the outer peripheral surface of a cylindrical column and the pawl may be configured to engage with a latch that protrudes from a predetermined area of the inner peripheral surface of the clutch gear.

Also, the pinion gear may include a first pinion gear and a second pinion gear configured to share the center of rotation and to couple in a longitudinal direction, and the second pinion gear may have a gear tooth only in a predetermined area of the outer peripheral surface.

Also, the second pinion gear may be configured to engage with the second rack gear.

Also, the auto-open door lock device may further include a switch terminal installed at a location corresponding to the micro switch and configured to generate a control signal according to a location of the rack slide.

Effect of Invention

An auto-open door lock device according to an example embodiment may have a relatively simple structure, may have a relatively low manufacturing cost, and may secure durability.

Also, compared to the existing door lock device, the auto-open door lock device according to an example embodiment may be implemented with a compact size and may be advantageous in securing a space accordingly.

Also, a consumer may easily cope with the failure of a door lock device that may occur inadvertently.

DETAILED DESCRIPTION

Figure 1:
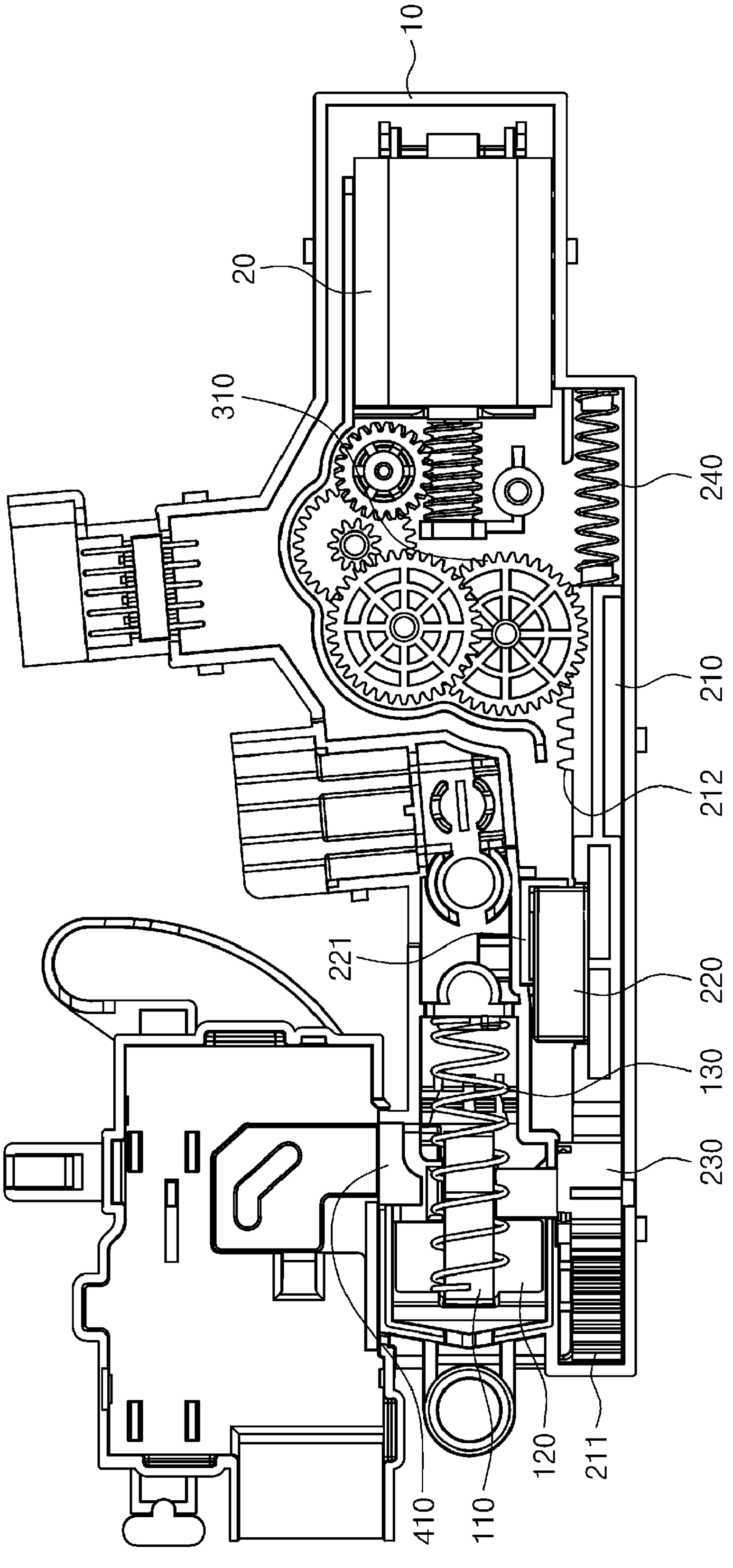
FIG. 1 is a front cross-sectional view of an auto-open door lock device according to an example embodiment.

Specific structural or functional descriptions related to example embodiments according to the concept of the present invention set forth herein are simply provided to explain the example embodiments according to the concept of the present invention and the example embodiments according to the concept of the present invention may be implemented in various forms and are not limited to the example embodiments described herein.

Various modifications may be made to the example embodiments according to the concept of the present invention. Therefore, the example embodiments are illustrated in the drawings and are described in detail with reference to the detailed description. However, the example embodiments are not construed as being limited to specific forms and should be understood to include all changes, equivalents, and replacements within the idea and the technical scope of the present invention.

Although terms of "first," "second," and the like may be used to explain various components, the components are not limited to such terms. These terms are used only to distinguish one component from another component. For example, a first component may be referred to as a second component, or similarly, the second component may be referred to as the first component within the scope of the present invention.

When it is mentioned that one component is "connected" or "joined" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, the example embodiments will be described in detail with reference to the accompanying drawings. However, the scope of the claims is not limited to or restricted by such example embodiments. Like reference numerals refer to like components throughout.

FIG. 1 is a front cross-sectional view of an auto-open door lock device according to an example embodiment.

Figure 2:
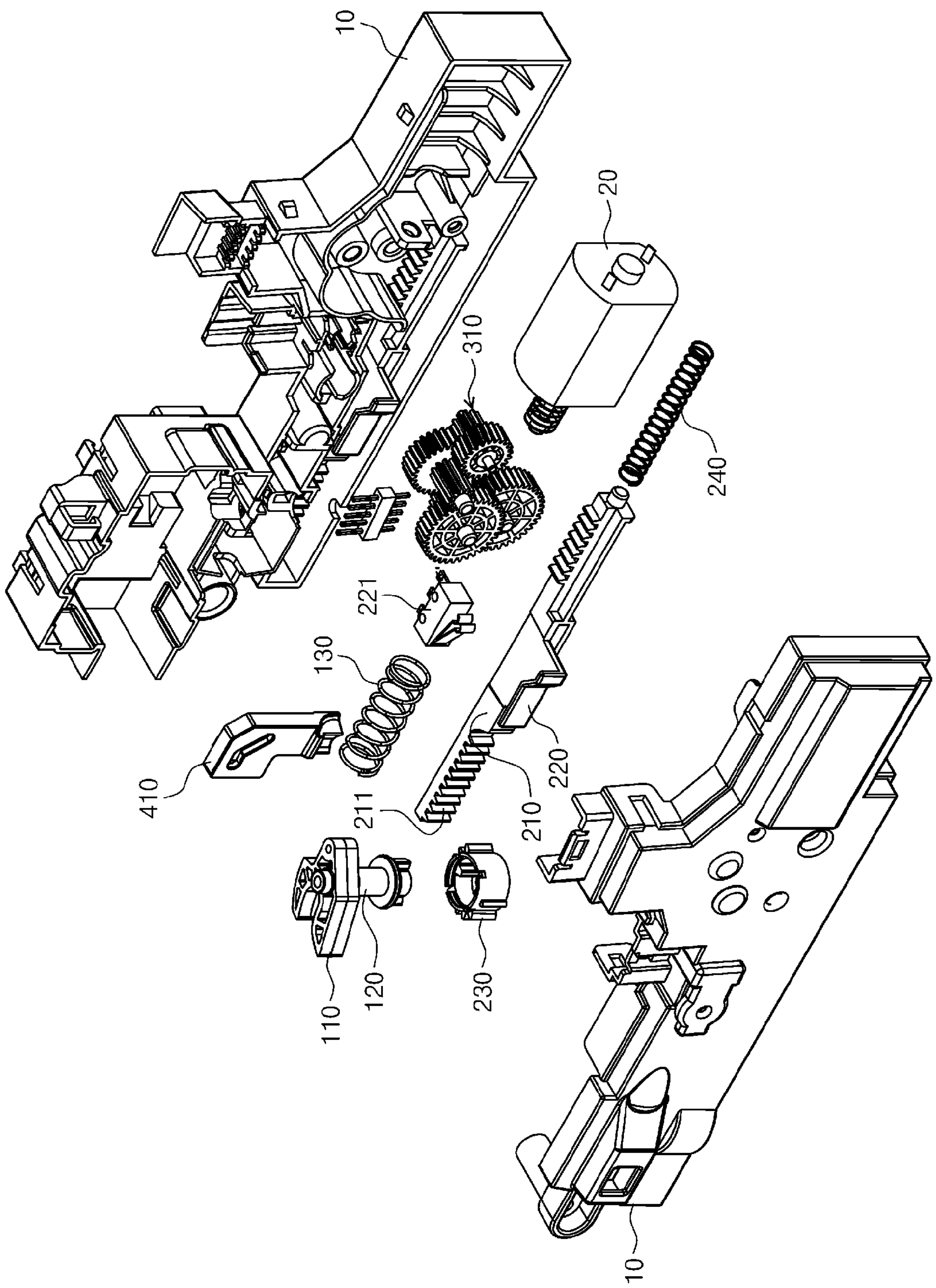
FIG. 2 is an exploded perspective view of an auto-open door lock device according to an example embodiment.

FIG. 2 is an exploded perspective view of an auto-open door lock device according to an example embodiment.

Referring to FIGS. 1 and 2, an auto-open door lock device according to an example embodiment refers to an auto-open door lock device including a main body cover 10 having an internal space and a motor 20 installed in the main body cover 10 to provide a driving force and includes a locker 110 configured to couple to or separate from a hook that is introduced from an outside through rotation, a locker shaft 120 having one end connected to the locker 110 and formed at the center of rotation of the locker 110, a clutch gear 230 configured to connect to another end of the locker shaft 120 and to induce rotation of the locker 110, a locker spring 130 configured to connect to one side of the locker 110 and to provide a rotational restoring force to the locker 110, a rack slide 210 configured to provide a rotational force of the motor 20 to the locker 110 through the clutch gear 230, and a pinion gear 310 configured to transmit the rotational force of the motor 20 to the rack slide 210.

The locker 110 refers to a portion to which a hook attached to a door of a home appliance generally couples and is configured to be rotatable at a predetermined angle. The locker 110 refers to a portion to which the hook couples and that is directly subject to a load and may be formed of a metal alloy material or a plastic material that ensures as much rigidity as possible. The locker 110 may be implemented in various shapes and may have an angled ring shape with one side open as illustrated in FIGS. 1 and 2.

When the locker 110 rotates by a designed predetermined angle and a coupling portion of the hook is introduced inside the locker 110, the locker 110 rotates to prevent the hook from being separated in the same direction and the locker 110 reversely rotates to the angle when the hook is introduced and the hook may be disengaged.

One end of the locker shaft 120 is connected to the locker 110. The locker shaft 120 may be integrally formed with the locker 110 and may be firmly assembled with the locker 110. In particular, the locker shaft 120 may simultaneously perform the function of a rotation shaft on which the locker 110 rotates.

The clutch gear 230 is connected to the other end of the locker shaft 120 and induces the rotation of the locker 110. The clutch gear 230 has one open end and has gear teeth formed on the outer peripheral surface in a hollow cylindrical shape. The clutch gear 230 is firmly coupled at the other end of the locker shaft 120 and transmits a rotational force transmitted through the clutch gear 230 to the locker 110 through the locker shaft 120.

Figure 3:
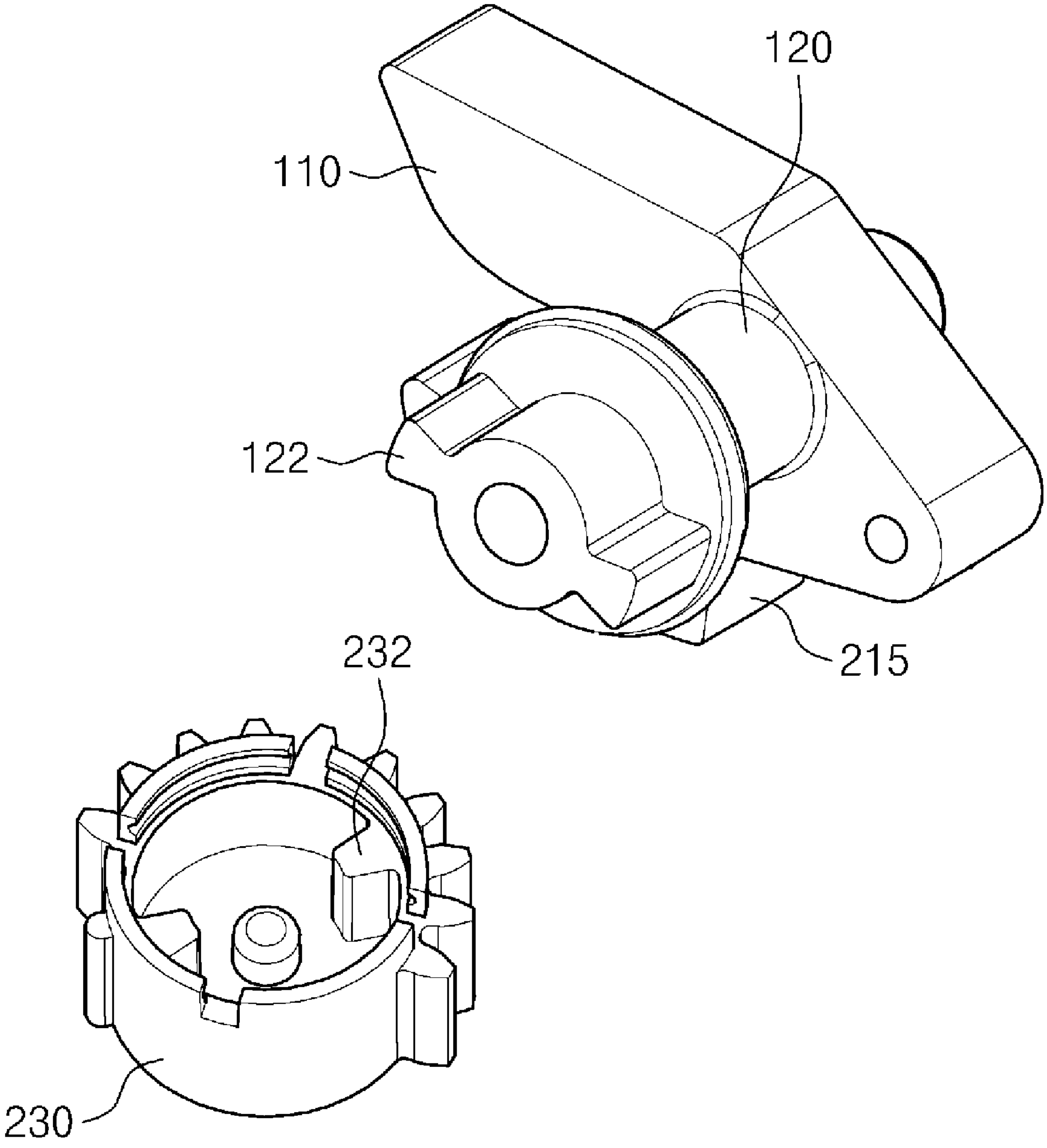
FIG. 3 is a detailed perspective view of a locker and a crutch gear according to an example embodiment.

FIG. 3 is a detailed perspective view of a locker and a crutch gear according to an example embodiment.

Referring to FIG. 3, the other end of the locker shaft 120 is formed with a pawl 122 that protrudes from a predetermined area of the outer peripheral surface of a cylindrical column and the pawl 122 is configured to engage with a latch 232 that protrudes from a predetermined area of the inner peripheral surface of the clutch gear 230 that is connected at the other end of the locker shaft 120.

The pawl 122 is formed in a sector shape having a specific angle such that an engagement state with the latch 132 may be maintained. Referring to FIG. 3, two pawls 122 may be formed at symmetrical locations.

The clutch gear 230 may be formed with the latch 232 that protrudes from the predetermined area of the inner peripheral surface and may be formed in the same shape as that of the pawl 122 formed at the other end of the locker shaft 120.

A method for rotation of the locker 110 and rotation of the clutch gear 230 by the locker shaft 120 is further described below.

The locker spring 130 is connected to one side of the locker 110, more particularly, to an opposite side of a portion to which the hook couples based on the locker shaft 120. Also, one end of the locker spring 130 is fastened to a separation wall of the main body cover 10 and provides a continuous elastic force to the locker 110. The locker spring 130 applies the elastic force in the direction of the locker 110 at all times. Referring to FIGS. 1 and 2, in the case of connecting the locker spring 130 to the locker 110, the locker 110 may maintain an angle of rotation in a closed state at all times or in an open state at all times.

That is, the locker 110 may not be in an intermediate state of closing or opening due to the continuous elastic force (repulsion or repulsive force) applied by the locker spring 130. When the elastic force (repulsion or repulsive force) of maintaining the closed state that is a state in which the hook is introduced continuously acts and the locker 110 is in the open state by removing the hook from the locker 110 due to an external force, the locker 110 does not rotate and remains in the open state by the locker spring 130 without another external force being applied.

That is, referring to FIGS. 1 and 2, the locker spring 130 may have one end coupled to a hole to be formed at the rear of the locker 110 and may be firmly connected to the locker 110. In a state in which the hook is introduced and is coupled to the locker 110, the locker spring 130 enters a state in which minimum load is applied to the locker spring 130. Also, when the hook retracts and is removed from the locker 110, the minimum load is applied to the locker spring 130 connected to the locker 110 and the open state is maintained.

The rack slide 210 is in a shape of an elongated column and is provided to slidably perform a linear motion on the main body cover 10. The rack slide 210 may be formed of a plastic material or a metal material, but is not limited thereto.

Referring to FIGS. 1 and 2, the rack slide 210 includes a first rack gear 211 configured to engage with the clutch gear 230 in a predetermined area at its one end, a second rack gear 212 configured to engage with the pinion gear 310 to be described below in a predetermined area at its another end, and a micro switch 220 formed between the first rack gear 211 and the second rack gear 212

The surface of the rack slide 210 on which the first rack gear 211 is formed and the surface of the rack slide 210 on which the second rack gear 212 is formed may differ from each other, but is not limited thereto.

Also, the micro switch 220 formed between the first rack gear 211 and the second rack gear 212 includes a conductive electrode of a conductive material and accordingly, may control the motor 20 by transmitting an electrical signal to a control device for controlling the auto-open door lock device through connection between the conductive electrode and a switch terminal 221.

The switch terminal 221 is installed at a location corresponding to that of the micro switch 220 and generates a control signal according to a location of the rack slide 210.

The pinion gear 310 may be directly connected to the motor 20 or may be connected to the motor 20 in association with a few gears, and refers to a gear that directly rotates with a rotational force of the motor 20.

Figure 4:
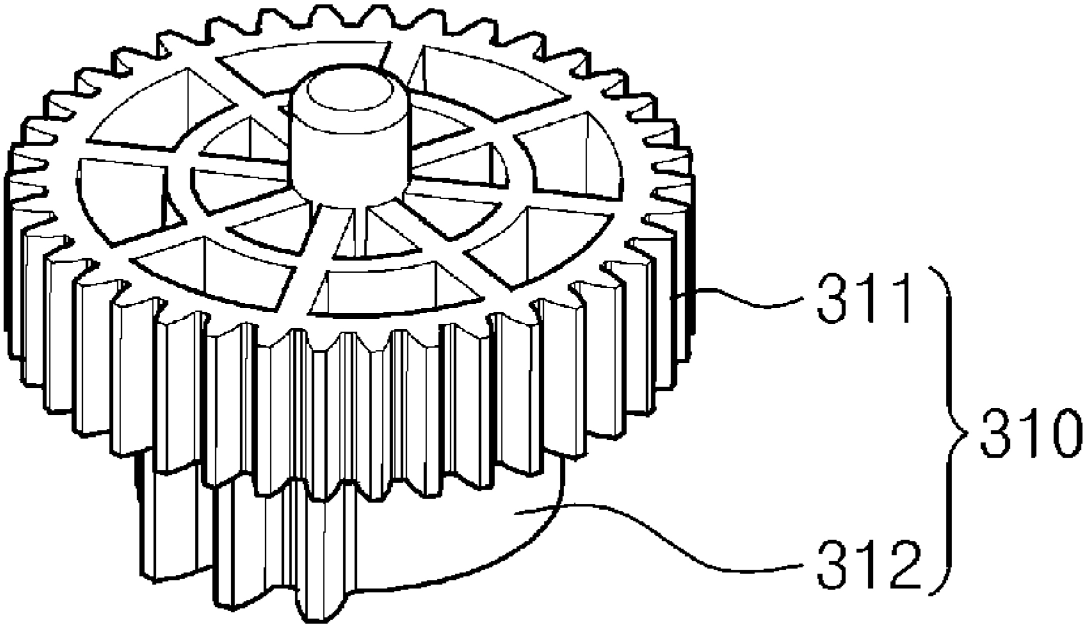
FIG. 4 is a perspective view of a pinion gear according to an example embodiment.

FIG. 4 is a perspective view of a pinion gear according to an example embodiment.

Referring to FIG. 4, the pinion gear 310 according to an example embodiment may include a first pinion gear 311 and a second pinion gear 312 configured to share the center of rotation and to couple in a longitudinal direction, and the second pinion gear 312 may be formed with gear teeth only in a predetermined area of the outer circumferential surface.

Here, through the second rack gear 212 of the rack slide 210 and the second pinion gear 312 being coupled and the first pinion gear 311 being directly or indirectly connected to the motor 20, the motor 20 rotates and the first pinion gear 311 rotates and, at the same time, the second pinion gear 312 rotates accordingly. Here, the second pinion gear 312 rotates with the second rack gear 212 through engagement with gear teeth, and, in a predetermined section without a gear tooth, the second rack gear 212 is not constrained by the rotational force of the motor 20 and may freely transfer the rack slide 210 toward the clutch gear 230.

The auto-open door lock device according to an example embodiment includes a slide spring 240 and a locker locking slide 410.

One end of the slide spring 240 is coupled to the main body cover 10 and another end thereof is connected to the rack slide 210 to linearly move the rack slide 210 toward the clutch gear 230. That is, in a state in which the second rack gear 212 formed in the rack slide 210 and the second pinion gear 312 are engaged, the rack slide 210 is constrained by the rotational force of the motor 20 and moves in the direction of the motor 20. However, in an area in which a gear tooth is absent in the second pinion gear 312, the rack slide 210 is not affected by the rotational force of the motor 20 and moves in the direction of the clutch gear 230 by the slide spring 240. A movement of the rack slide 210 by the slide spring 240 is described in detail with reference to FIGS. 6A to 6D.

The locker locking slide 410 moves in the direction of the locker 110 and fastens the locker 110 through coupling to a locker fastening groove 215 of FIG. 3. A linear movement method of the locker locking slide 410 may be variously implemented. In particular, when a home appliance is driven in a closed state in which the locker 110 is coupled to the hook in a protruding area toward the locker 110, the locker locking slide 410 functions to prevent rotation of the locker 110 such that the locker 110 and the hook are not separated by an external force.

Main components that constitute the auto-open door lock device according to an example embodiment are described. Hereinafter, a driving method of the auto-open door lock device according to an example embodiment is further described with reference to FIGS. 5 and 6.

Figure 5A:
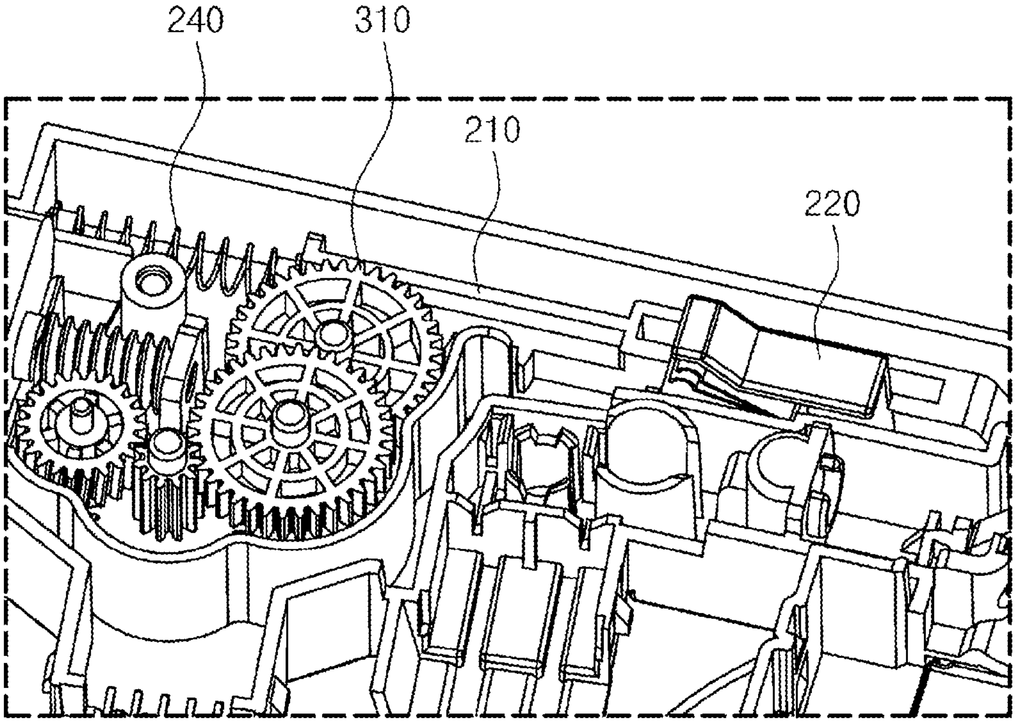
FIGS. 5A and 5B illustrate driving states of a rack slide according to an example embodiment.
Figure 5B:
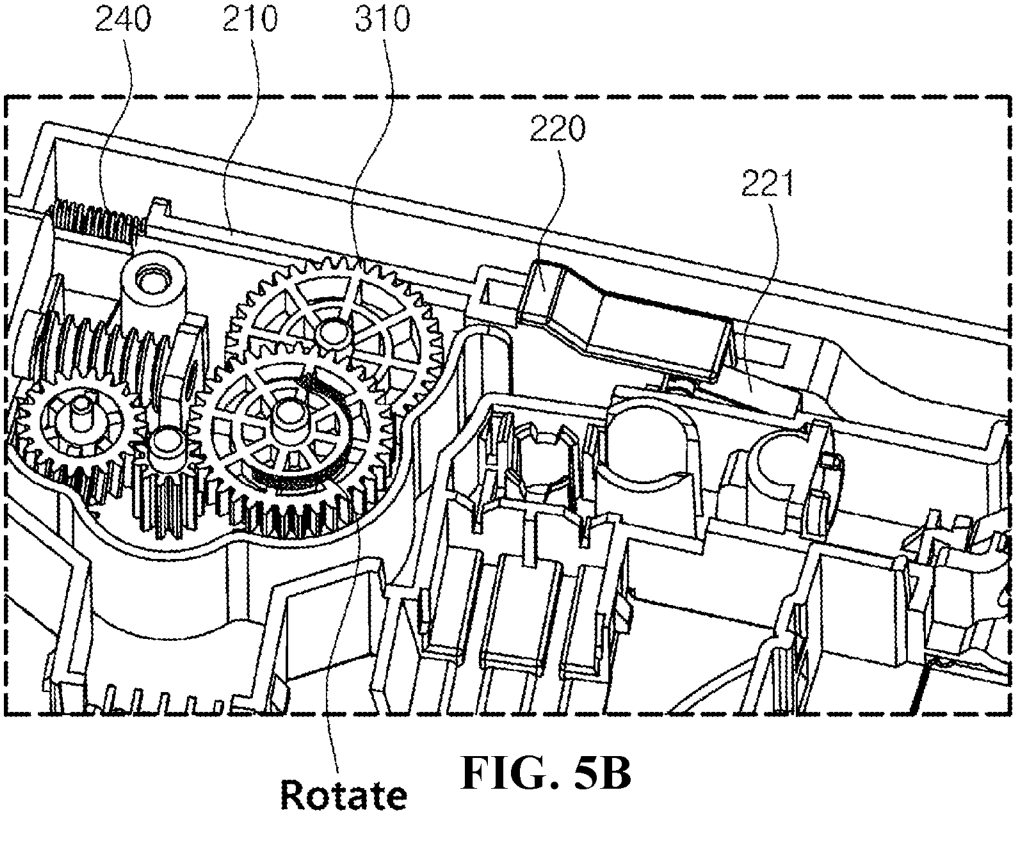

FIGS. 5A and 5B illustrate driving states of a rack slide according to an example embodiment.

FIGS. 6A to 6D illustrated driving states of a locker and a crutch gear according to an example embodiment.

Referring to FIG. 5A, in a state in which the slide spring 240 is tensioned, the rack slide 210 is placed at the origin. Here, the micro switch 220 and the switch terminal 221 are connected and generate a first control signal. When the rack slide 210 is placed at the origin, a user may open and close a door of a home appliance without unreasonableness. Also, when the rack slide 210 is placed at the origin, the locker locking slide 410 is operated to make the locker 110 be in a locked state.

On the contrary, referring to FIG. 5B, when the motor 20 rotates, the pinion gear 310 rotates and moves the rack slide 210 in the direction of the slide spring 240. In a situation such as (b), the micro switch 220 and the switch terminal 221 generate a second control signal to thereby prevent an excessive external force from being applied to the locker 110 and to prevent the locker locking slide 410 from being introduced in the direction of the locker 110, and when the locker 110 is in a locked state with the locker locking slide 410, releases the locked state to prevent the excessive external force from being applied to the motor 20.

Figure 6A:
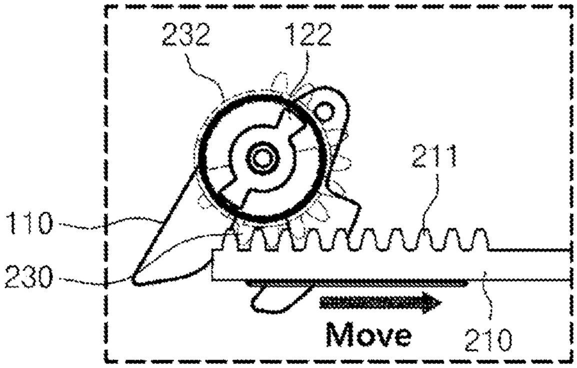
FIGS. 6A to 6D illustrate driving states of a locker and a crutch gear according to an example embodiment.

Also, referring to FIG. 6A, when the rack slide 210 moves to the right (the motor 20 rotates and the rack slide 210 moves by the second pinion gear 312) for auto-open of a door, the first rack gear 211 rotates the clutch gear 230 and the latch 232 formed in the clutch gear 230 rotates the locker 110 through coupling to the pawl 122 formed in the locker shaft 120.

Here, as the locker 110 rotates, the hook and the looker 110 are decoupled and the door is automatically opened.

Figure 6B:
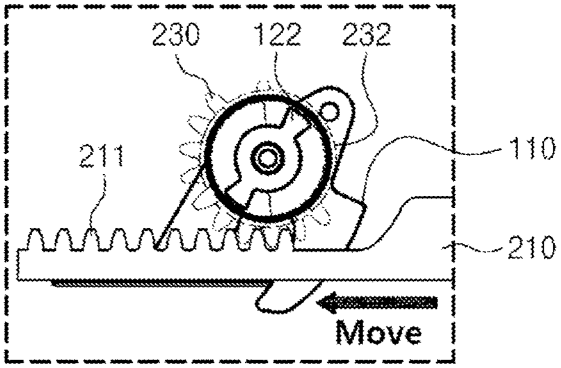
Figure 6C:
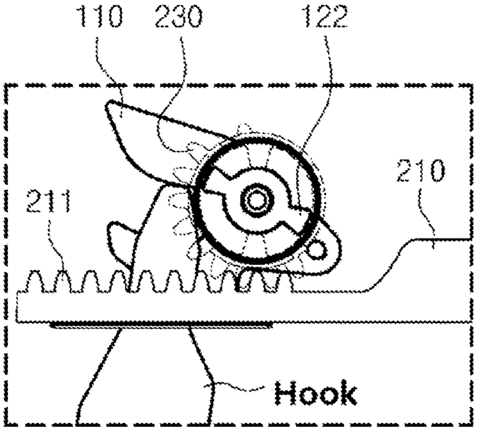
Figure 6D:
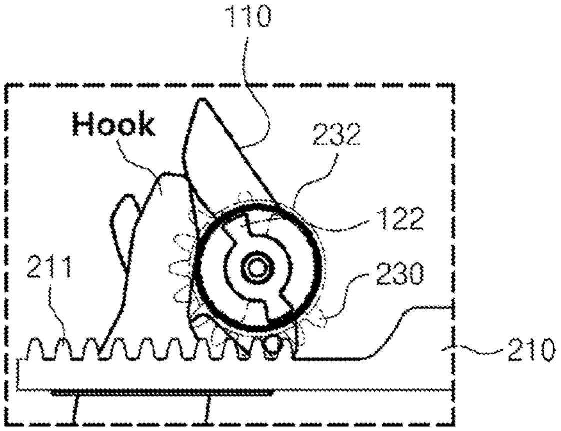

Referring to FIG. 6B, when the second rack gear 212 meets a portion in which the gear teeth of the second pinion gear 312 are absent, the rack slide 210 moves in the direction of the locker 110 due to the elastic force of the slide spring 240 and enters an origin state of FIGS. 5A and 5B.

In the origin state, although the locker shaft 120 rotates clockwise, the latch 232 and the pawl 122 are not coupled and the locker shaft 120 and the locker 110 may freely rotate clockwise. In a state of (c) in which the hook enters, the clutch gear 230 does not rotate and the locker shaft 120 and the locker 110 rotate clockwise while engaging with the hook. Further, in a state of (d), when the hook is fully introduced and the locker 110 is no longer rotatable, it is a state in which the latch 232 of the clutch gear 230 and the pawl 122 of the locker shaft 120 are coupled. FIG. 5A that is the origin state corresponds to FIG. 6B to 6D and a state in which the motor 20 rotates and the rack slide 210 moves in the direction of the slide spring 240 as in FIG. 5B corresponds to a state in which the door is automatically opened.

While the present invention is described with reference to the illustrated example embodiments, it is provided as an example only and it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the true technical protection scope of the present invention should be determined by the technical spirit of the claims.

What is claimed:

1. An auto-open door lock device comprising a main body cover having an internal space and a motor installed in the main body cover to provide a driving force, the auto-open door lock device comprising:

a locker configured to couple to or separate from a hook that is introduced from an outside through rotation;

a locker shaft having one end connected to the locker and formed at the center of rotation of the locker;

a clutch gear configured to connect to another end of the locker shaft and to induce rotation of the locker;

a locker spring configured to connect to one side of the locker and to provide a rotational restoring force to the locker;

a rack slide configured to provide a rotational force of the motor to the locker through the clutch gear; and a pinion gear configured to transmit the rotational force of the motor to the rack slide, wherein the rack slide comprises:

a first rack gear configured to engage with the clutch gear in a predetermined area at one end;

a second rack gear configured to engage with the pinion gear in a predetermined area at another end; and a micro switch formed between the first rack gear and the second rack gear, wherein the other end of the locker shaft is formed with a pawl that protrudes from a predetermined area of the outer peripheral surface of a cylindrical column and the pawl is configured to engage with a latch that protrudes from a predetermined area of the inner peripheral surface of the clutch gear.

2. The auto-open door lock device of claim 1, further comprising:

a slide spring configured to linearly move the rack slide in the direction of the clutch gear through one end being coupled to the main body cover and another end being connected to the rack slide.

3. The auto-open door lock device of claim 1, wherein the pinion gear comprises a first pinion gear and a second pinion gear configured to share the center of rotation and to couple in a longitudinal direction, and the second pinion gear has a gear tooth only in a predetermined area of the outer peripheral surface.

4. The auto-open door lock device of claim 3, wherein the second pinion gear is configured to engage with the second rack gear.

5. The auto-open door lock device of claim 1, further comprising:

a switch terminal installed at a location corresponding to the micro switch and configured to generate a control signal according to a location of the rack slide.

* * * * *